United States Patent
Cao et al.

(10) Patent No.: US 7,716,596 B2
(45) Date of Patent: May 11, 2010

(54) DYNAMIC INPUT FIELD PROTECTION

(75) Inventors: Andrew H. Cao, Round Rock, TX (US); Yen-Fu Chen, Austin, TX (US); Fabian F. Morgan, Austin, TX (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 652 days.

(21) Appl. No.: 11/557,567

(22) Filed: Nov. 8, 2006

(65) Prior Publication Data

US 2008/0109747 A1     May 8, 2008

(51) Int. Cl.
G06F 3/048     (2006.01)
(52) U.S. Cl. .................. 715/780; 715/224; 715/700
(58) Field of Classification Search .......... 715/221, 715/780, 700
See application file for complete search history.

(56) References Cited

U.S. PATENT DOCUMENTS

| | | | |
|---|---|---|---|
| 6,069,628 A * | 5/2000 | Farry et al. ............... 715/835 |
| 6,181,115 B1 * | 1/2001 | Perol et al. ............... 323/234 |
| 6,952,778 B1 | 10/2005 | Snyder | |
| 6,996,719 B2 | 2/2006 | Riordan | |
| 7,062,500 B1 | 6/2006 | Hall et al. | |
| 2002/0175955 A1 * | 11/2002 | Gourdol et al. ........... 345/821 |
| 2003/0046401 A1 * | 3/2003 | Abbott et al. ............. 709/228 |
| 2003/0182527 A1 | 9/2003 | Witt, Jr. | |
| 2004/0236878 A1 | 11/2004 | Chang et al. | |
| 2007/0209038 A1 * | 9/2007 | Fuchs et al. ............... 719/313 |

* cited by examiner

*Primary Examiner*—Weilun Lo
*Assistant Examiner*—Kim-Lynn Dam
(74) *Attorney, Agent, or Firm*—Yee & Associates, P.C.; William H. Steinberg

(57) ABSTRACT

A computer implemented method and computer program product for protecting a pre-filled user input field on a returned webpage from an accidental overwrite. The method identifies the pre-filled input field by detecting a mouseover. In response to a user command to change the state of the pre-filled input field, the method changes an initially unlocked pre-filled input field to a locked state or changes an initially locked pre-filled input field to an unlocked state.

14 Claims, 3 Drawing Sheets

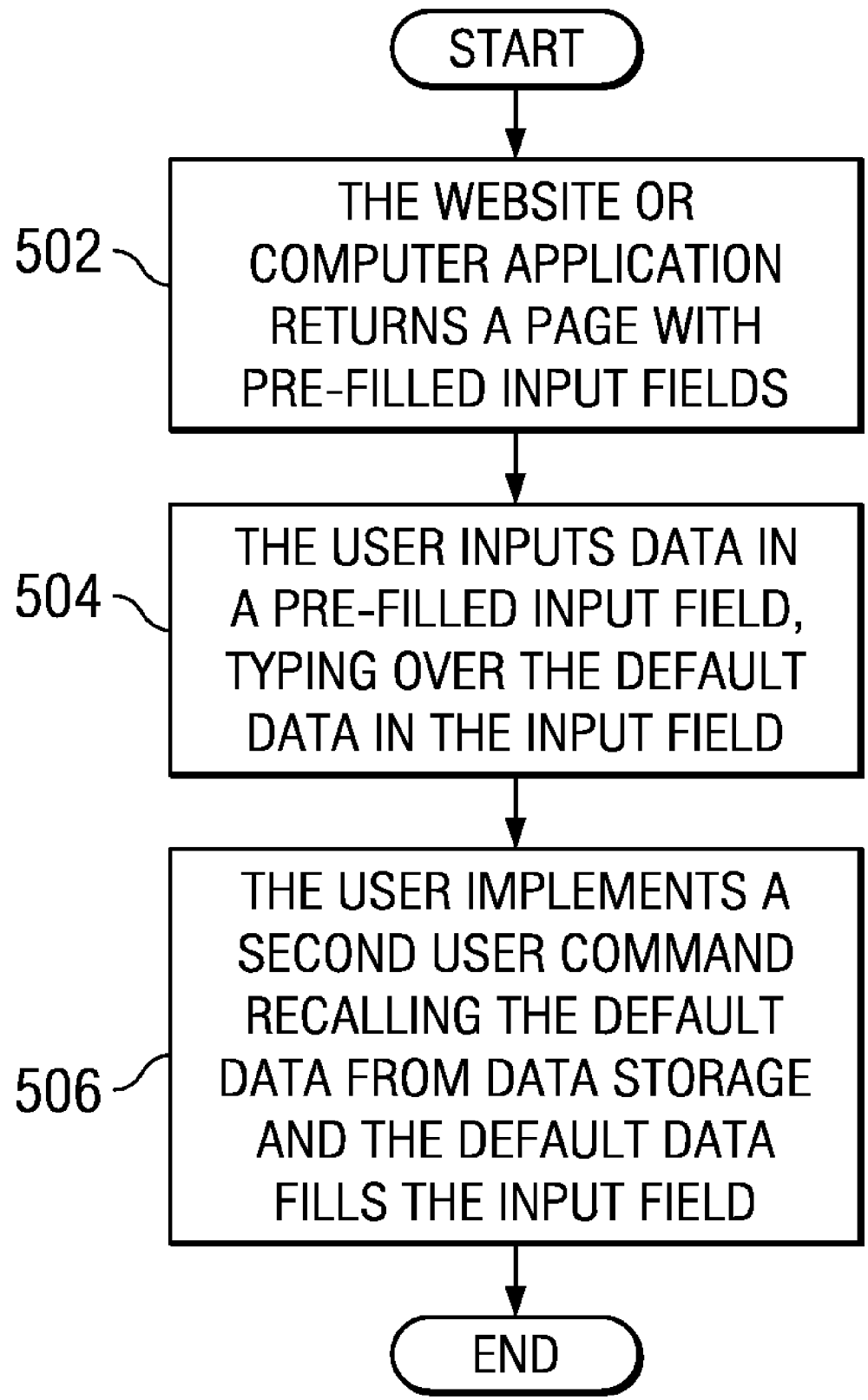

DYNAMIC INPUT FIELD PROTECTION

BACKGROUND OF THE INVENTION

1. Field of the Invention

The illustrative embodiments relate generally to an improved data processing system and in particular to a method for processing data. Still more particularly, the illustrative embodiments are related to a computer implemented method and computer program product for protecting pre-filled user input fields from an accidental overwrite.

2. Description of the Related Art

A growing number of computer applications and Internet websites require a user to provide information, such as a name, address, and account number, before the website may transact with the user. Websites may also require the user to create a user id and/or a password to interact with the website. The user input fields are typically shaded to indicate that the input fields are editable. The user may then type all of the required information and perhaps some additional information into the input fields. Depending on the website, a considerable amount of information may be input into the webpage. Some of the information may not be readily available to the user such as hard to remember account numbers or passwords.

Upon presenting the webpage to the user on a return visit, many websites may, as a convenience to the user, pre-fill the user information into the user input fields. Pre-filling the input fields saves the user the task of retyping the information. A pre-filled input field, as used herein, indicates an editable input field that contains default data upon the display of the webpage. Encrypted passwords may also be pre-filled into a returned webpage.

Historically, pre-filled input fields are unprotected, editable fields. Therefore, if the user accidentally types over the existing data in the input field, that existing data may no longer be available during the session. Often if the user logs out of the website and logs back into the website, the default data will pre-fill the input field and the user may then proceed. Retyping is a loss of time and an inconvenience for the user. However if the user fails to note an overtype error in an input field and submits the webpage, the default data may be altered to the new mistaken value, leading to a loss of data. The user may then need to look up account numbers and passwords to resubmit the webpage.

SUMMARY OF THE INVENTION

The illustrative embodiments provide a computer implemented method and computer program product for protecting a pre-filled user input field on a returned webpage from an accidental overwrite. The method identifies the pre-filled input field by detecting a mouseover. In response to a user command to change the state of the pre-filled input field, the method changes an initially unlocked pre-filled input field to a locked state or changes an initially locked pre-filled input field to an unlocked state.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a flow chart that illustrates a process for recalling default data for pre-filled input fields in accordance with the illustrative embodiments.

DETAILED DESCRIPTION OF THE PREFERRED EMBODIMENT

Figure 1:
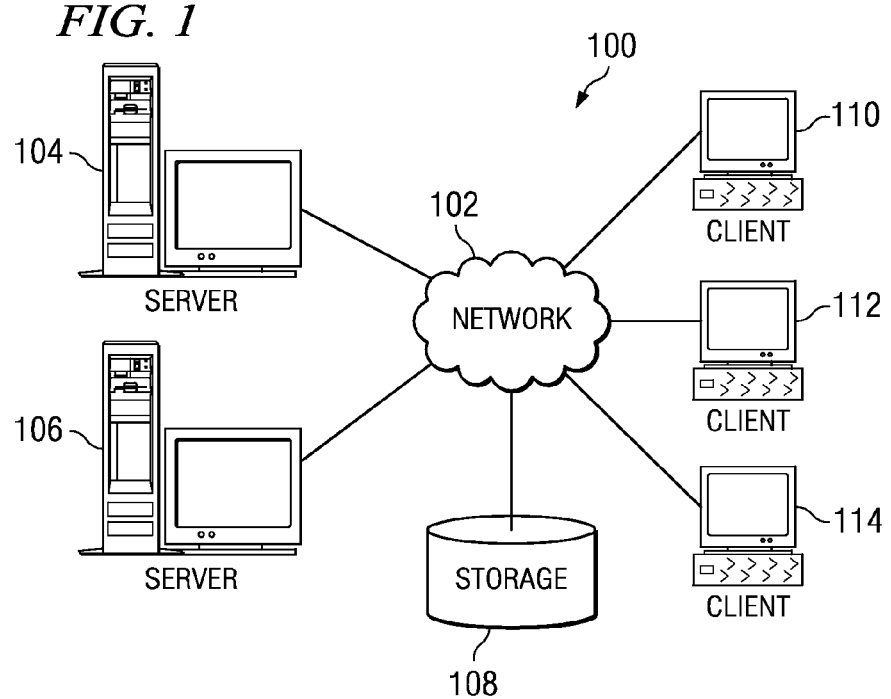
FIG. 1 depicts a pictorial representation of a network of data processing systems in which illustrative embodiments may be implemented.
Figure 2:
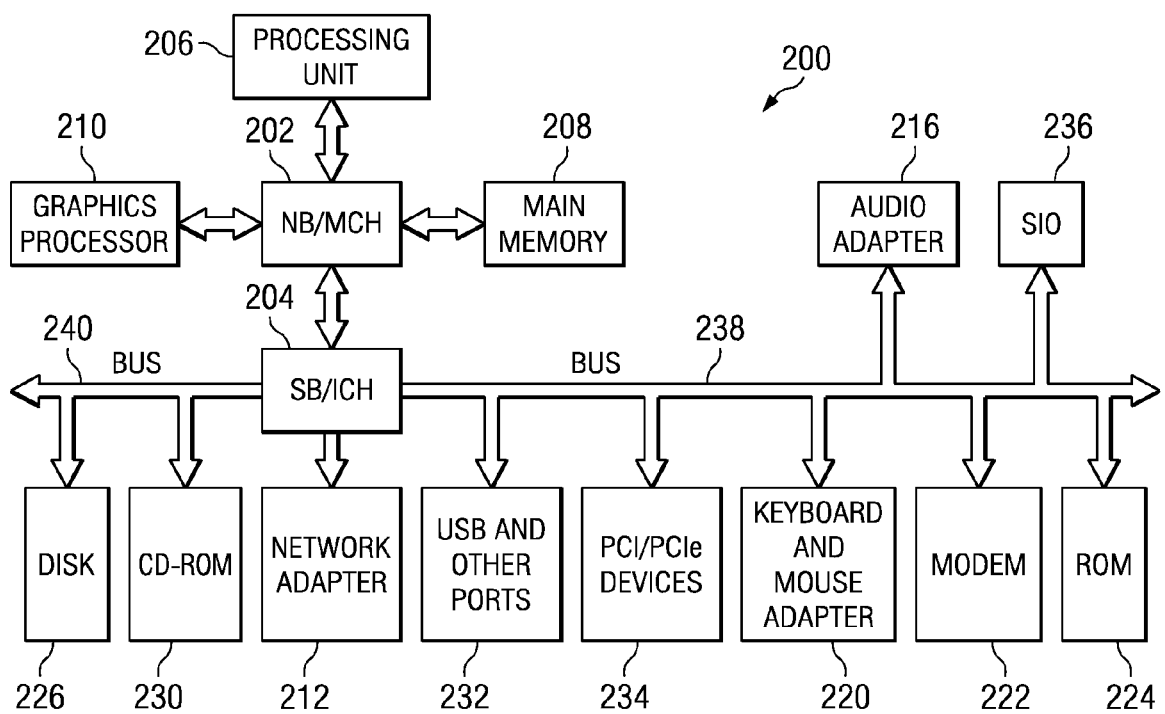
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments provide a computer implemented method and computer program product for protecting pre-filled user input fields from an accidental overwrite. The user input fields may be from a computer application or from a returned website. An input field may be for example checkboxes and textboxes. Those of ordinary skill in the art will appreciate that there are many such input fields. Consider the case of a repeat customer of an online store. The customer decides to purchase a product through the online store's website. The customer selects the product and proceeds to the payment webpage. The payment webpage displays all of the input fields with the default data of the returning customer displayed, such as all of the users billing and shipping information. The customer accidentally types over her credit card number. Historically, the customer must get the credit card and retype the correct number into the field. Alternatively, the customer may recover the default data if she logs out and logs back into the website. The original default data may not be available if the customer entered the accidental data in the input field after typing. Retyping the data is inconvenient to the customer and may cause the customer to decide not to complete the purchase, thereby losing a sale for the online store.

By comparison, a website, implementing the illustrative embodiments, may lock individual input fields on a webpage. Locking the input field on a webpage means to write protect the input field. In other words, the input field may not be changed while in a locked state. The accidental type over of the default data is therefore rendered less likely. In another illustrative embodiment, the returned pre-filled input fields may be defaulted to a locked state.

In another illustrative embodiment, the administrator of the website may control the initial state of each input field individually. An administrator of a website is a person responsible for the functioning of the website. Typically, an administrator has the ability to make global changes to the website. For example, the administrator may base the initial lock state of a pre-filled input field on elapsed time, such as the expiration date of a password. The pre-filled password field for a particular user may default to unlocked when the password of that user expires. Another example may be to automatically set an input field to locked, if the user has not changed the data in the input field for a configurable period of time.

In addition, the administrator may base the initial lock state of a pre-filled input field on an event, such as a system level requirement to increase the length of a password. The pre-filled input password field may default to unlocked, for all users of the web site.

In yet another illustrative embodiment, the administrator may configure changes in a particular pre-filled input field based on the frequency of user lock state changes. For example, if a website defaults an input field for a user shipping address to an unlocked state and twenty thousand unique users change the input field to a locked state, the website would automatically change the input field for a shipping address to default to a locked state.

To change the data in the input field intentionally, the customer may mouseover the input field, to identify the input field. The user may then implement a user command that changes the lock state of the input field. A mouseover occurs when a user rests the mouse pointer over the input field without selecting the input field. Those of ordinary skill in the art will appreciate that the mouseover information associated with the input field may be accessed in other ways such as a right-click. A right-click is performed by placing the mouse pointer or the curser over the identifier and manipulating the right mouse button. In other words, a mouseover selection of the input field may occur by manipulating the mouse over the input field or by placing the curser over the input field without selecting the input field.

The process then pops up a text box with instructions for the use of a lock switch command. In a pop-up display, information, such as the set of lock function keys, is displayed. A pop-up display is a window that suddenly appears (pops up) when the user rests the mouse pointer, presses a special function key or right-clicks, while the mouse pointer is indicating a particular field or icon. The pop-up window contains the information associated with the input field only as long as the mouse pointer rests on the identifier. When the user moves the mouse pointer away from the identifier, the pop-up display disappears.

Information about the lock state of the input field may be visible during the mouseover. The user may see the current lock state of the input field and instructions for using the command to change the lock state. The pop-up display may also display the state change needed based on the administrative rules or website statistics. The lock state may also be indicated by a text color change or text font change to indicate a locked or unlocked state. An indicator is any indication of lock state. A text color change means the text in a locked pre-filled input field is a different color from text in an unlocked pre-filled input field. A text font change means the text in a locked pre-filled input field is a different font than the text in an unlocked pre-filled input field. Those of ordinary skill in the art will appreciate that other indicators may be implemented.

By implementing the user command while the mouseover instructions are visible, the customer can toggle the input field between locked (write protected) and unlocked (unprotected). Changing the lock state of an input field switches the input field between locked and unlocked.

In accordance with the illustrative embodiments, the website may pre-lock all, some, or none of the pre-filled input fields. In another embodiment, the user may be allowed to configure a list of input fields that will be displayed pre-locked from all websites if pre-filled. The illustrative embodiments may be implemented on a server, such as server 106 in FIG. 1 or the embodiments may be implemented on client devices such as clients 110 and 112 of FIG. 1. In another embodiment, the parts of the process may be implemented on multiple devices.

Figure 3:
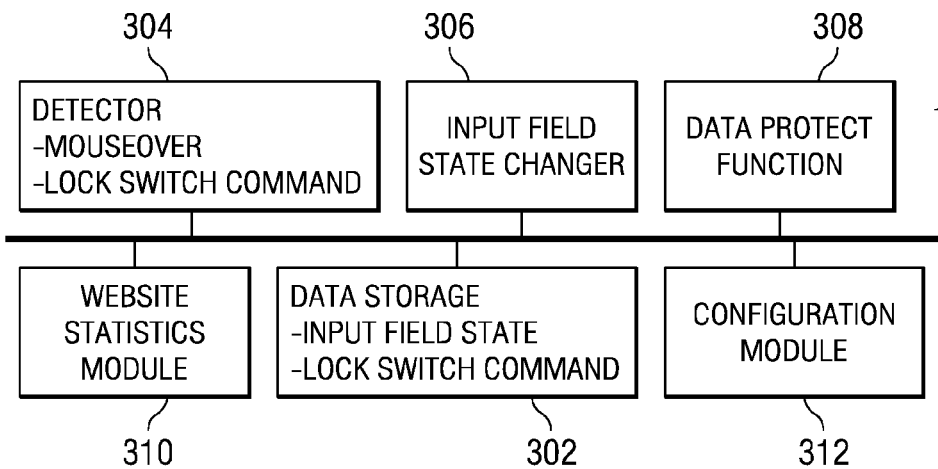
FIG. 3 is a block diagram of the basic components for protecting pre-filled input fields in accordance with the illustrative embodiments.

FIG. 3 is a block diagram of the basic components for protecting pre-filled input fields in accordance with the illustrative embodiments. The computer program product contains data storage 302, such as storage 108 in FIG. 1. Data storage 302 stores the lock state of each of the input fields of the customer. A lock state indicates whether an input field is write protected (locked state) or unprotected (unlocked state). Data storage 302 also contains the set of lock function keys required to toggle the input field between a locked and an unlocked state. In another embodiment, a customer may be able to choose the set of keys required to change the lock state of an input field in a user configuration file. As used herein, the set of keys is at least one physical command, such as a combination of keys for example "ALT L", a single key such as the function key "F3", a right mouse click, or a combination of any of the above. Data storage 302 also stores the default data of the pre-filled input fields.

Detector 304, input field state changer 306, and input field data protect function 308 may all reside in a processing unit, such as processing unit 206 in FIG. 2. Detector 304 is capable of detecting a mouseover on an input field. The detector may also detect the implementation of a set of lock function keys. The detector may also detect a recall user command. After inputting new data into the pre-filled input field, a user may recall the default data for that input field by implementing a recall user command.

Input field state changer 306 changes the lock state of the input field upon the detection of the implementation of the lock function keys during a mouseover on the input field. Data protect function 308 write protects the data in an input field, if the input field is in a locked state. Website statistics module 310 gathers statistics on state changer 306. Configuration module 312 allows website administration configuration of initial defaults and user configuration of the lock state command.

Figure 4:
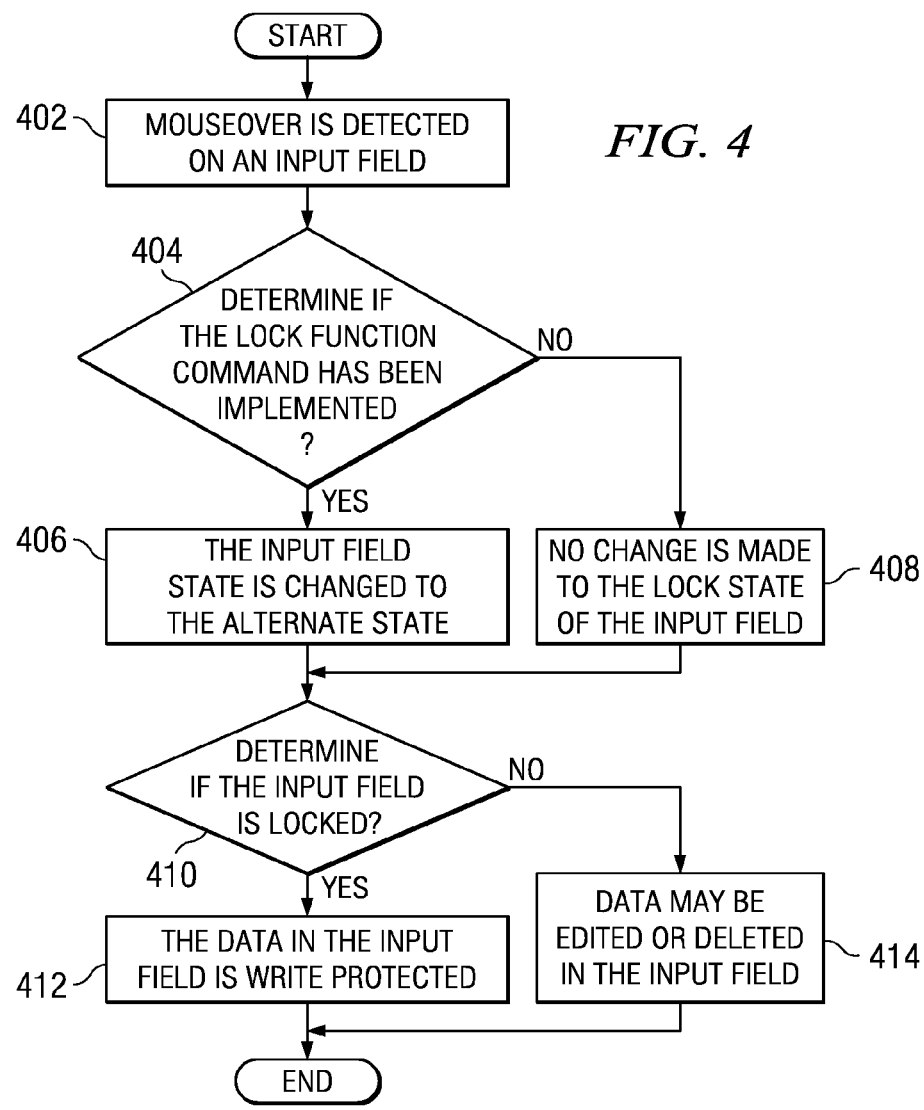
FIG. 4 is a flowchart that illustrates a method for protecting pre-filled input fields in accordance with the illustrative embodiments.

FIG. 4 is a flowchart that illustrates a process for protecting pre-filled input fields in accordance with the illustrative embodiments. The process begins as a mouseover is detected on an input field (step 402). The process determines if the lock function command has been implemented (step 404). If the lock function command has been implemented (yes output to step 404) the input field lock is changed to the alternate state (step 406). In other words, if the state was initially locked the state will be changed to unlocked. Conversely, if the state was unlocked initially, the state will be changed to locked. Returning to step 404, if no lock function command has been implemented (no output to step 404) then no change is made to the lock state of the input field (step 408).

Next, the process determines if the input field is locked (step 410). If the input field is locked, then the data in the input field is write protected (step 412). The user may not write over the data unless the state of the input field is changed to unlocked. However if the input field is not locked (no output to step 410) then the data in the input field may be edited or deleted (step 414). The process ends there after.

FIG. 5 is a flow chart that illustrates a process for recalling default data for pre-filled input fields in accordance with the illustrative embodiments. The website or computer application returns a page with pre-filled input fields (step 502). The user inputs data in a pre-filled input field, typing over the default data in the input field (step 504). The user implements a second user command recalling the default data from data storage, such as data storage 302 in FIG. 3. The default data fills the input field (step 506). The process ends there after.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, the program for use by or in connection with the instruction execution system, apparatus, or device.

The medium can be an electronic, magnetic, optical, electromagnetic, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for protecting data in a pre-filled input field from an accidental overwrite by a user, the computer implemented method comprising:

identifying the pre-filled input field by detecting a mouseover of the pre-filled input field by the user;

responsive to an identification of the pre-filled input field, detecting a user command of the user to change a state of the pre-filled input field;

responsive to detecting the user command, changing an initially locked pre-filled input field to an unlocked state;

responsive to detecting the user command, changing an initially unlocked pre-filled input field to a locked state that prevents the user from modifying the initially unlocked pre-filled input field; and gathering statistics on a frequency of lock state changes per pre-filled input field; and configuring an initial lock state of the field based on the statistics;

wherein the initial lock state of the field is the default state of the field when the field is initially presented to the user when the user newly accesses a previously accessed website by the user.

2. The computer implemented method of claim 1, wherein the user command is a first user command and further comprising:

implementing the first user command using a set of lock function keys.

3. The computer implemented method of claim 2 further comprising:

allowing a user to define the set of lock function keys.

4. The computer implemented method of claim 1 further comprising:

locking the pre-filled input field upon display of a webpage.

5. The computer implemented method of claim 1, wherein an administrator controls an initial lock state of a field based on an elapsed time of the field, wherein the initial lock state of the field is the default state of the field when the field is initially presented to the user when the user newly accesses a previously accessed website by the user.

6. The computer implemented method of claim 1, wherein an administrator controls an initial lock state of a field based on an event trigger, wherein the initial lock state of the field is the default state of the field when the field is initially presented to the user when the user newly accesses a previously accessed website by the user.

7. The computer implemented method of claim 1 further comprising:

responsive to a second user command, recalling an initial data for the pre-filled input field.

8. The computer implemented method of claim 1 further comprising:

indicating the lock state of the pre-filled input field using information contained in a pop-up display.

9. A computer program product comprising:

a computer usable medium including computer usable program code stored thereon for protecting a pre-filled input field from an accidental overwrite by a user, the computer program product comprising:

computer usable program code for identifying the pre-filled input field by detecting a mouseover of the pre-filled input field by the user;

computer usable program code for detecting a user command of the user to change a state of the pre-filled input field, responsive to an identification of the pre-filled input field;

computer usable program code for changing an initially unlocked pre-filled input field to a locked state that prevents the user from modifying the initially unlocked pre-filled input field, responsive to detecting the user command;

computer usable program code for changing an initially locked pre-filled input field to an unlocked state, responsive to detecting the user command; and computer usable program code for gathering statistics on a frequency of lock state changes per pre-filled input field; and configuring an initial lock state of the field based on the statistics;

wherein the initial lock state of the field is the default state of the field when the field is initially presented to the user when the user newly accesses a previously accessed website by the user.

10. The computer program product of claim 9, wherein the user is a returning user to a website, and the pre-filling input field contains default information previously entered by the returning user during a previous access to the website by the returning user.

11. The computer implemented method of claim 1, wherein the user is a returning user to a website, and the pre-filling input field contains default information previously entered by the returning user during a previous access to the website by the returning user.

12. The computer implemented method of claim 1, wherein the pre-filled input field contains a credit card number that the user is using to make a purchase at an online store's website.

13. The computer implemented method of claim 1, further comprising a list of input fields, wherein the list of input fields is configurable by the user to specify that a given input field in the list of input fields has a default state of locked if the given input field is a pre-filled input field.

14. The computer implemented method of claim 13, wherein the list of input fields is maintained in a data storage device that also maintains values for the pre-filled input fields and an initial lock state for the pre-filled input fields.

* * * * *